Feb. 20, 1951  R. E. STAPLES  2,542,265
ROTATABLE AUTOMATIC BROILER-GRIDDLE
Filed March 28, 1945  3 Sheets-Sheet 1
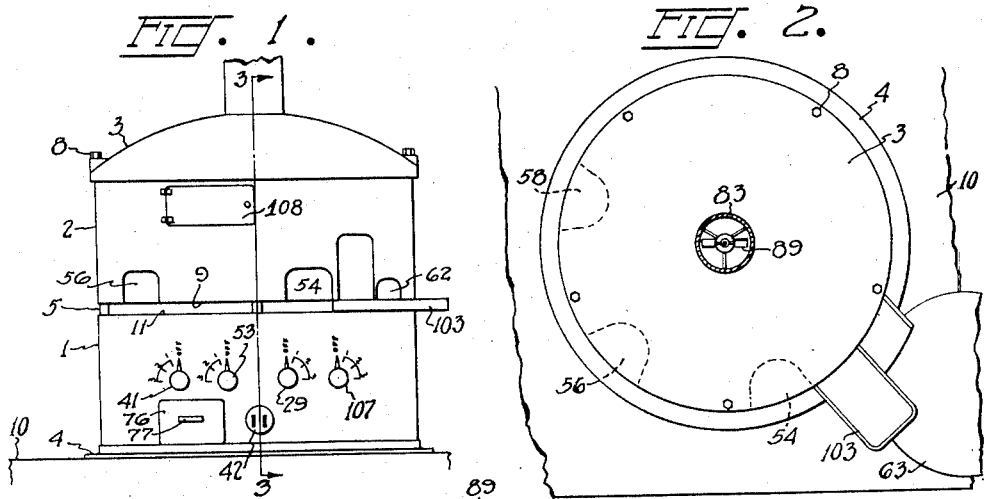
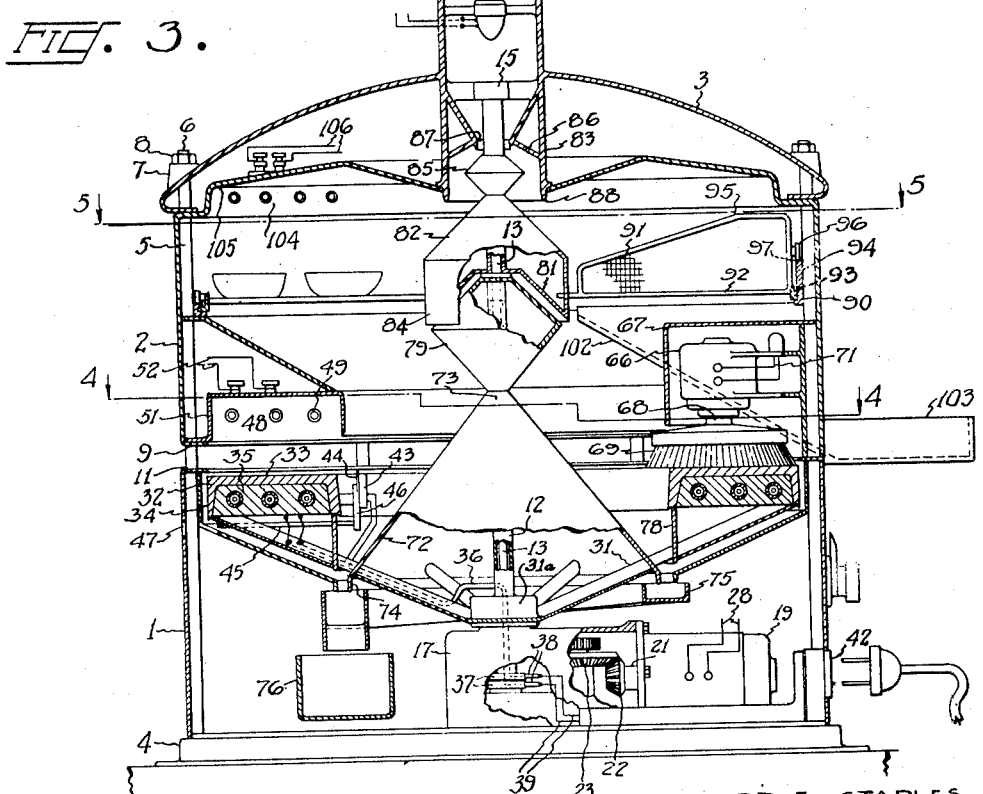
RICHARD E. STAPLES
INVENTOR.
BY *Harold D. Cook*
ATTORNEY.

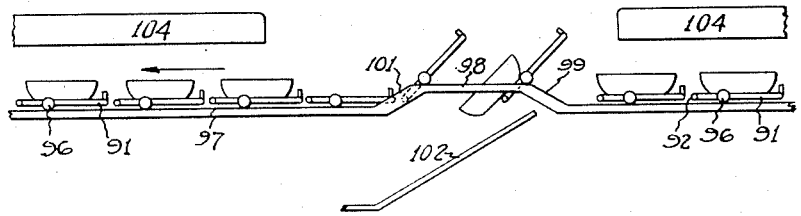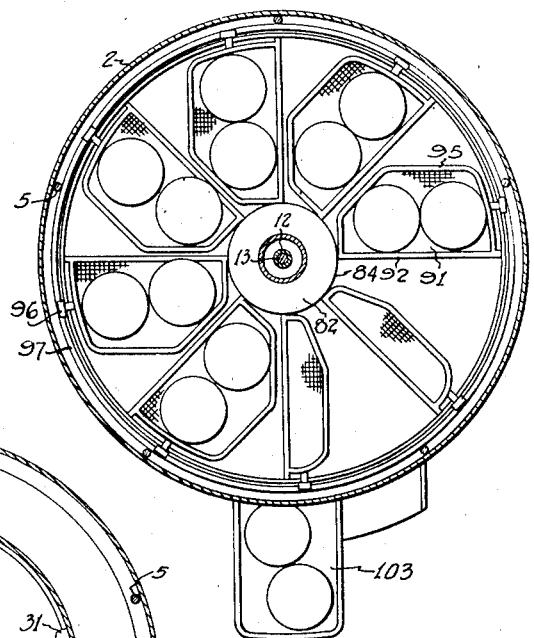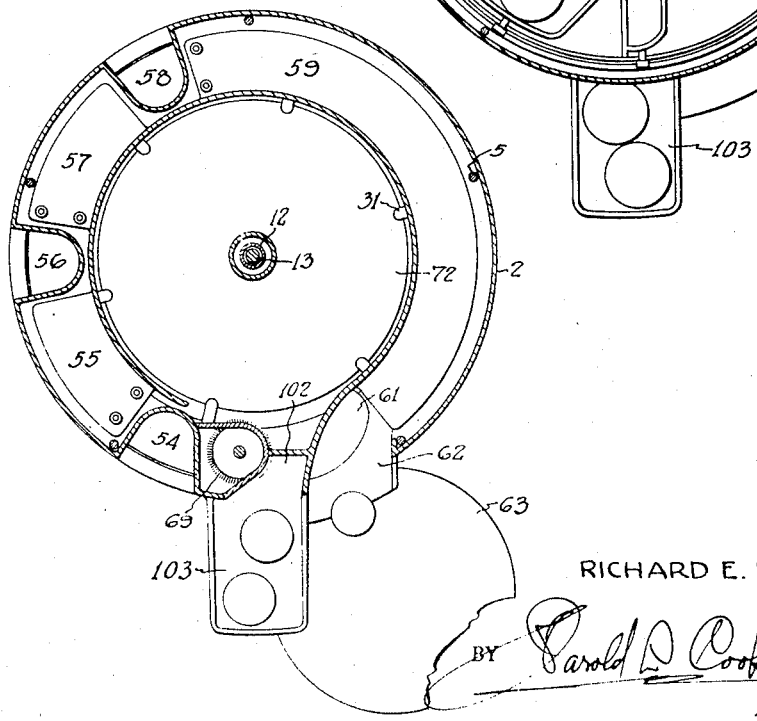

Feb. 20, 1951 R. E. STAPLES 2,542,265
ROTATABLE AUTOMATIC BROILER-GRIDDLE
Filed March 28, 1945 3 Sheets-Sheet 3
FIG. 7.
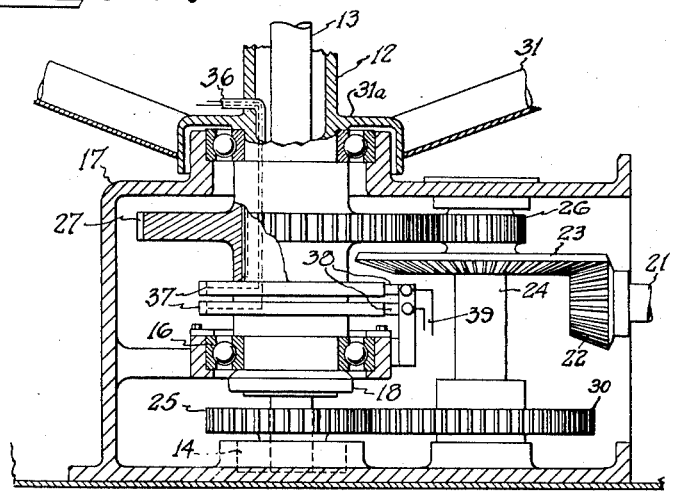
FIG. 8.
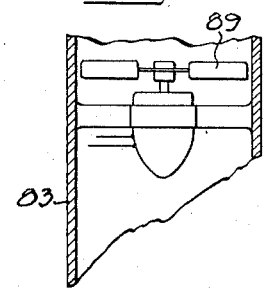
FIG. 9.
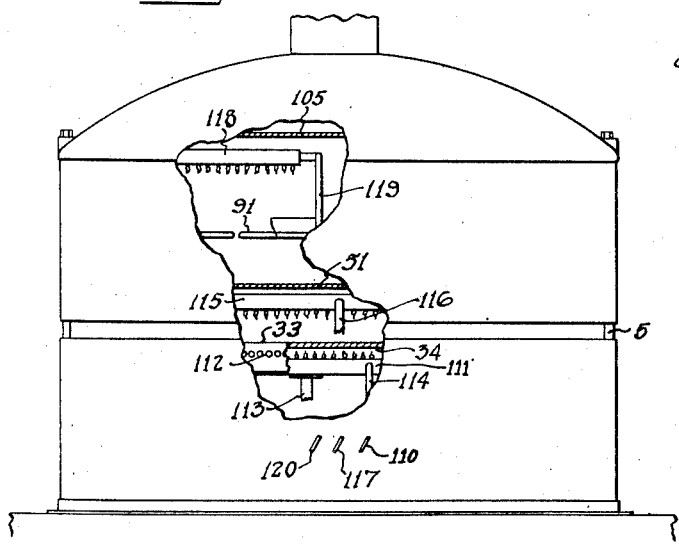
INVENTOR
RICHARD E. STAPLES
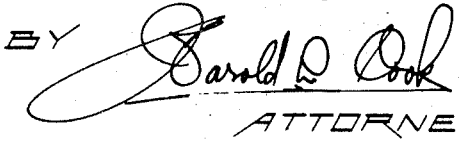
ATTORNEY Patented Feb. 20, 1951

2,542,265

UNITED STATES PATENT OFFICE 2,542,265

ROTATABLE AUTOMATIC BROILER-GRIDDLE

Richard E. Staples, Portland, Oreg.

Application March 28, 1945, Serial No. 585,280

10 Claims. (Cl. 99—423)

This invention relates to a rotary cooking apparatus having means comprising a rotatable griddle for supporting food products to be cooked, and for passing said food products through a heat zone disposed between input and discharge stations of the apparatus at a rate which will accomplish the desired degree of cooking during rotation of the griddle between said input and discharge stations.

Heretofore meats have been prepared, other than by roasting or stewing, by direct exposure to the source of heat as in broiling and barbecuing or by transmitting the heat through a fry pan or griddle as in frying. The broiling process sears and dries the outside surface of the meat, leaving the interior portion hot and juicy but quite undercooked. Only tender meat, thickly cut, will produce a good broiled product. A disadvantage of the process stems from the fact that, though heat may be applied evenly to all exposed surfaces of the meat, a very considerable amount of the juices drip from the meat and are lost, so that if the broiling were continued for a sufficient length of time to thoroughly cook the meat the result would be a dry unpalatable product.

The preparation of meat by frying embodies cooking the meat in its own juices by placing the meat on a heated surface. The frying of meat usually requires the application of cooking fats or oils to prevent the meat adhering to the hot surface, and a certain amount of overcooked fat is absorbed into the meat to be consumed therewith. A disadvantage of the fry process is that overcooked fats absorbed into the meat during frying are not easily digested.

The instant invention has for its principal object the provision of a process for cooking meat embodying both the application of heat by means of a heated surface, as in the frying process, and direct exposure to a source of heat as in broiling. In the process embodying the invention the meat is cooked by the simultaneous application of heat through a griddle and by direct exposure to a heat source. By this process both sides of the meat are sealed almost simultaneously and the few escaping juices tend to be steamed back into the meat and have a tenderizing effect and result in more uniform cooking and a more flavorous product. The direct exposure to a source of heat quickly sears the upper or exposed surface of the meat at the same time that the under side is being cooked by the application of heat through the griddle. Thus the process effects a saving in cooking time, and the consequent saving of juices ordinarily lost during the cooking process, it being unnecessary to interrupt the application of heat to accomplish turning the meat, or for testing its condition, or otherwise, the apparatus functioning to deliver the cooked product when a desired degree of cooking has been attained.

The invention does not in any sense comprise a confined area constituting an oven for roasting or baking meats or other foodstuffs, but rather combines essential characteristics of a griddle and a broiler in an apparatus providing for automatic product control and complete ventilation of fuel and cooking vapors.

The drawings illustrate the invention as embodied in a rotary cooking device designed primarily for preparing sandwiches consisting essentially of toasted buns and inserts of cooked meat such as hamburger. The device comprises a rotatable circular griddle which rotates in a horizontal plane under fixed broiler units. The speed of rotation is so adjusted as to accomplish the maximum degree of cooking during the maximum distance of rotation of the griddle from the point at which the meat is placed on the griddle to the point at which it is removed therefrom. Other points at which the meat may be placed on the griddle require shorter distances of travel to the point of removal for effecting shorter cooking periods. Thus the desired variations in the degree of cooking of food products may be accomplished automatically by using fixed cooking temperatures and predetermined speeds of rotation of the griddle, and varying the cooking period as represented by the distance of travel from the point at which the meat is placed on the griddle to the point of removal therefrom.

The device also comprises a rotatable grill which rotates in a horizontal plane under a fixed heating unit, and is especially adapted for toasting buns and the like for use in preparing toasted sandwiches. Since the two halves of a bun may occupy approximately twice the area on the grill as the meat insert occupies on the griddle, the speed of rotation of the grill may be somewhat faster than the speed of rotation of the griddle on which the meat is cooked, so that a sufficient number of buns may be toasted for use in making the number of sandwiches represented by the number of meat inserts on the griddle. Rotation of the grill and griddle effects delivery of both toasted buns and cooked meat inserts to the point of discharge from the device ready to be combined into a sandwich. Provision is made for the removal of smoke, gases, heat and vapors during the cooking process, and for the recovery within the apparatus of products of condensation from such vapors.

It is, therefore, a further object of the invention to provide a device for facilitating the delivery of cooked meat and toasted bread for the preparation of sandwiches.

It is a further object of the invention to provide a device by which meat may be prepared as "well done," "medium" or "rare" without requiring attention from an operator other than the placing of the meat on the cooking surface at the proper point to obtain the desired degree of cooking.

It is a further object of the invention to provide an apparatus for cooking meat embodying both the application of heat through a heated surface as in frying, and direct exposure to a source of heat as in broiling.

It is a further object of the invention to provide a device for cooking meat and/or toasting bread in which provision is made for expelling the cooked food from the device when the desired degree of cooking has been attained.

It is a further object of the invention to provide a cooking apparatus comprising a cooking chamber and having a ventilating system for said chamber through which vapors arising from the cooking surface are delivered away from the apparatus, and by means of which products of condensation such as grease, meat juices and the like are recovered therewithin.

It is a further object of the invention to provide a cooking apparatus comprising a chamber within which buns may be placed to be heated, and comprising also a ventilating system for withdrawing air and gases from said chamber provision being made for supporting the buns in the stream of heated air passing through said chamber whereby the buns may absorb heat from said air prior to its withdrawal from said apparatus.

While the device illustrated in the drawings comprises a practical application of the invention and the one likely to be most widely used, it is not intended to limit the invention to the details of construction and arrangement of parts illustrated in the accompanying drawings nor as described in the following specification. The terminology employed herein is for the purposes of description and not of limitation, it being understood that various changes in form, proportion, size and details of construction within the scope of the claims may be resorted to without departing from the spirit or sacrificing any of the advantages of the invention.

In the drawings: Figure 1 is a side elevation of a rotary cooking device embodying the invention, illustrating the arrangement of the openings through which food products may be placed on the griddle to accomplish desired variations in the cooking time, and showing also the arrangement of the control switches; Figure 2 is a top plan view of the rotary cooker shown in Figure 1; Figure 3 is a sectional elevation of the rotary cooker taken on the line 3—3 of Figure 1; Figure 4 is a cross sectional view showing the cooking surface of the griddle and the points of placement and discharge therefrom, the view being taken on the line 4—4 of Figure 3; Figure 5 is a cross sectional view taken on the line 5—5 of Figure 3, illustrating the arrangement of the trays or grills for the buns; Figure 6 is an elevational view of the trays or grills for the buns and illustrates the mechanism for tipping the trays at the point of discharge from the device; Figure 7 is a fragmentary sectional elevation illustrating the driving mechanism for both the griddle and the toasting rack, and illustrating also the mechanism for conveying electric current to the heating elements in the griddle; Figure 8 is a sectional elevation of a portion of the pipe comprising the ventilating system; and Figure 9 is a sectional elevation of a rotary cooker equipped with gas burners in place of the electrical heating units shown in Figure 3.

Referring to Figure 1 of the drawings, the device is illustrated as a cabinet comprising a lower circular wall 1 and an upper circular wall 2 disposed in alignment with the lower wall, and a dome shaped cover 3. The device is supported upon a circular base 4 and the over-all height of the device is such as to make it convenient to place the device on a counter or table 10 of such height as to present the griddle and toasting rack at an elevation suited to the needs of the operator. The upper surface of the base 4 is offset adjacent its periphery to form a shoulder against which the lower wall portion 1 is fitted so as to make a relatively tight joint between the wall and the base.

The upper portion of the cabinet, including the wall 2 and cover 3, is supported upon a plurality of uprights 5 spaced equally about the periphery of the base 4 and secured thereto in any suitable manner. The threaded upper ends 6 of the uprights 5 extend through bosses 7 provided therefor on the cover 3, the cover being removably secured in place by any suitable fastening means such as the nuts 8. In the construction shown the uprights 5 are in the form of bolts which secure the several parts of the structure in integral relation.

The lower edge 9 of the upper wall 2 is positioned a short distance above the upper edge 11 of the lower wall 1, providing a peripheral opening in the wall of the cabinet, the continuity of said opening being interrupted only by the upright members 5.

As shown in Figure 3, the structure comprises a vertical shaft consisting of an outer hollow shaft 12 (see Figure 7) and an inner shaft 13. The inner shaft 13 is journaled in bearings 14 supported on the base 4 and bearings 15 mounted in the cover 3. The outer shaft is journaled in bearings 16 mounted in a supporting framework 17 adjacent the lower end of the shaft, a collar 18 secured to the shaft transferring the thrust load from the shaft to the bearing. The upper end of the shaft 12 is supported by a bearing (not shown) mounted between the inner and outer shafts.

Secured to the shaft 12 and extending obliquely upward therefrom is a spider 31 on a hub 31a which constitutes a support for a circular griddle 32. The griddle 32 is in the form of a ring having an outside diameter closely approaching the diameter of the supporting structure as measured between diametrically opposite uprights 5, and having an inside diameter defining an opening therethrough of considerable extent, the difference in the outside and inside diameter of the griddle being sufficient, however, to provide a cooking surface 33 of sufficient width to receive thereon cuts of meat such as steaks, fish, hamburger and the like, to be cooked. The cooking surface 33 of the griddle 32 is supported in a horizontal plane a distance of the order of one inch or so below the upper edge 11 of the circular wall 1, so that the griddle surface is positioned out of the path of air entering the cabinet through the peripheral opening between the wall sections 1 and 2.

The driving mechanism for rotating the shafts 12 and 12 comprises a variable speed motor 19 having an armature shaft 21 on which is fixed a bevel gear 22. The bevel gear 22 meshes with bevel gear 23 keyed to a vertical shaft 24 on which is fixed an upper gear 26 and a lower gear 30. The gear 30 meshes with gear 25 keyed to shaft 13. Gear 26 which meshes with gear 27 keyed to shaft 12. By this means shafts 12 and 13 are driven from the same source of power, the inner shaft 13, however, being rotated at a greater speed than is shaft 12 for a purpose to be hereinafter more fully explained. Electric current for energizing the motor 19 is delivered through wire 28, the speed of the motor being controlled by means of a switch 29 having positions for determining the flow of electricity to the motor.

The griddle 32 is in the form of an inverted channel 34, and mounted within the channel closely adjacent the under surface of the griddle, or cast as an integral part thereof, is an electrical heating element 35, the said heating element 35 extending the full length of the channel 34.

Electric current is supplied to the heating element 35 by means of an electrical conduit 36 supported in one or more of the legs of the spider 31 and suitably connected to commutators 37 secured to the shaft 12 and being rotatable therewith. Commutator bars 38 mounted in the framework 17 of the structure have wiping contact with the commutators 37, lead wires 39 supplying current thereto from a switch having a button 41 mounted on the outer wall 1 of the cabinet. Electric current for use both as heat and power may be supplied to the device by means of a plug and socket connection 42.

Affixed to the inner wall of the channel 34 is a thermostat 43 for controlling the temperature of the cooking surface 33. The thermostat 43 is wired into the electrical circuit 36 and controls the flow of electric current to the heating element 35 in whatever amount is required to maintain the cooking surface 33 at a given temperature. The thermostat 43 is equipped with a dial 44 which extends above the cooking surface 33 so as to be visible to an operator through any one of the openings in the wall of the cabinet through which food products are placed on the cooking surface. The thermostat may be set to operate at any given temperature by means of an actuating rod 45 connected to the dial 44 by a gear train 46, the actuating rod 45 projecting radially outward from the thermostat and terminating in a squared end which is designed to clear the uprights 5 during rotation of the griddle. An opening 47 through the wall 1 provides access to the squared end of the actuating rod and through which a suitable tool may be inserted for engaging and turning the rod whereby the thermostat is set to operate at a desired temperature as indicated by the visible portion of the dial 44.

Mounted above the griddle 32 is a broiler unit 48 comprising an electrical heating element 49, the broiler unit being generally circular and having a heat reflecting area substantially equal to the area of the cooking surface 33 of the griddle 32. The heating element 49 is mounted in an inverted channel member 51 having substantially the same cross sectional area as the cooking surface 33 of the griddle 32, and having an outside and inside diameter commensurate with the griddle 32. The broiler unit 48 is stationarily mounted in the upper portion of the cabinet, being positioned a distance of the order of an inch or so above the plane of the lower edge 9 of the circular wall 2. The depending side walls of the recess or channel 51 in which the heating element 49 is mounted extend downwardly to approximately the plane of the lower edge 9 of the wall 2 so as to direct the heat from the element 49 onto the cooking surface 33. An electric conduit represented by wires 52 provides a connection with the socket 42, a switch being arranged in the circuit and having a button 53 mounted on the wall 1 of the cabinet.

Having reference to Figure 4, it will be seen that the broiler unit 48 and heating element 49, while generally circular in form, is interrupted at spaced intervals at the front side of the cabinet to provide relatively widely spaced areas in which the griddle is exposed for convenience in placing products thereon to be cooked. For this reason the broiling unit 48 comprises a plurality of sector units which may be described as extending through an arc beginning at the point adjacent the first opening 54 in the wall of the cabinet provided for placing meat on the griddle and extending through an angle of approximately 300 degrees to a point adjacent the opening 62 through which the meat is removed from the griddle. Thus the broiling unit comprises a sector 55 disposed above the cooking surface 33 between the first and second openings 54 and 56 in the wall of the cabinet, a sector 57 disposed above the cooking surface 33 between the second and third openings 56 and 58 in the wall of the cabinet, and a sector 59 disposed above the cooking surface 33 between the third opening 58 in the wall of the cabinet and the point of removal of the meat from the griddle surface. Thus the broiler unit 48 comprises a plurality of units arranged in spaced apart relation and providing access to the cooking surface at points between adjacent units for placing meat or other food products on the griddle, and providing for mounting devices for lifting the meat from the griddle and discharging it from the cabinet, as well as for mounting a device for cleaning the surface of the griddle after the meat has been removed therefrom.

The drawings illustrate an embodiment of the invention in which three openings are provided in the wall of the cabinet for exposing the griddle 32 at relatively widely separated points, each opening in the wall of the cabinet being aligned with the space between adjacent sectors of the broiling unit. The first opening 54 in the cabinet wall is located closely adjacent the opening 62 through which the cooked products are discharged from the cooking chamber. The distance from the first opening 54 to the point of removal of the cooked products from the griddle is the maximum distance of rotation of the griddle which can be achieved between a point of application of meat to the griddle and the point of removal of the meat therefrom. Food products placed upon the griddle through the first opening 54 in the wall of the cabinet travel the maximum distance of rotation before being removed from the griddle and receive the maximum degree of cooking which may be accomplished by the device. Under conditions of controlled cooking temperatures and predetermined speed of rotation of the griddle, meat placed on the griddle through the first opening 54 in the wall of the cabinet may receive that degree of cooking which produces a product commonly defined as "well done."

The second opening 56 in the wall of the cabinet is spaced from the first opening 54 in the direction of rotation of the griddle by an angle of approximately 30 degrees, the distance of rotation of the griddle from the second opening 56 to the point of removal of the food products from the griddle being shortened by the same number of degrees. Food products placed on the griddle through the second opening 56 in the wall of the cabinet pass under sectors 57 and 59 of the broiling unit 48 and receive the simultaneous application of heat through the griddle throughout a period represented by the distance of travel from the second opening in the wall of the cabinet to the point of removal from the griddle. Meat placed on the griddle through the second opening 56 is removed from the griddle at the point of discharge from the griddle in a condition commonly defined as "medium."

The third opening 58 in the wall of the cabinet is separated from the second opening 56 by a distance equal to the length of the sector 57 of the broiler unit, and is separated from the point of removal of the cooked product from the griddle by a distance equal to the length of sector 59 of the broiling unit. Meat placed on the griddle through the third opening 58 in the wall of the cabinet is removed therefrom at the point of discharge from the griddle in a condition commonly referred to as "rare."

In Figure 4 is illustrated a peel 61 which extends across the cooking surface 33 adjacent the discharge opening 62 for lifting cooked food products from the cooking surface 33 and discharging them therefrom through the opening 62 onto a platter 63. The peel 61 extends across the cooking surface 33 in a direction counter to the direction of rotation of the griddle which functions to lift the food product from the cooking surface and turn it through the opening in the wall of the chamber onto the platter 63.

Mounted between the opening 62 through which cooked food is discharged from the griddle and the first opening 54 through which meat is placed on the griddle is a griddle cleaning device comprising a motor 66 mounted in the housing 67 and having a vertically extending armature shaft 68 to which is secured a circular brush 69. The brush 69 is of greater diameter than the width of the cooking surface 33 and is so mounted as to have brushing contact over the full width of the cooking surface 33, one side of the brush overhanging the inside edge of the griddle. The motor 66 is energized by means of electrical energy supplied through electrical wiring 71, the flow of electric current being controlled by a switch, not shown, mounted on the wall of the cabinet. The brush 69 is rotated in a direction counter to that of the griddle 32, and because the brush 69 is of greater diameter than the width of the cooking surface 33 and overhangs the inside edge of the cooking surface, rotation of the brush 69 tends to sweep grease, meat particles and any other matter adhering to the surface 33 in a direction toward the center of the machine. Thus a clean cooking surface is presented at the area exposed by the first opening 54 in the wall of the cabinet through which meat may be placed on the griddle.

Mounted on the spider 31 is a conically shaped shield 72, the vertex 73 of the cone extending into the upper portion of the cabinet above the plane of the opening between wall portions 1 and 2, the lower end of the cone terminating in a short vertical wall section 74 depending into a circular trough 75 located in the lower portion of the cabinet. Thus the cone-like shield 72 extends both above and below the plane of the cooking surface 33 and serves as a splash plate for the mixture of grease, meat juices, particles of meat and the like, impinged thereagainst by action of the brush 69. These products flow down the sides of the cone-like shield 72 and drip from the lower edge of vertical wall 74 into the trough 75. It will be noted that the trough 75 slopes to a point of discharge into a drawer 76 extending into the cabinet at a point to receive the flow of products from the trough 75. The drawer 76 is equipped with a handle 77 to facilitate withdrawing the drawer from the cabinet at such times as the drawer is to be emptied.

In this connection also it will be noted that a splash plate 78 depends from the innermost side wall of the griddle 32 into the trough 75, the depending plate 78 and shield 72 comprising means for confining the splash created by rotation of the brush 69 and for directing the flow of hot grease, meat juices and the like into the collecting trough 75.

Mounted on the shaft 12 above the vertex of the conical shield 72 is a second shield 79 in the form of a double ended cone. The upper vertex of the shield 79 is secured to the upper end of the shaft 12, the lower end of the shield 79 being secured to the shaft 12 at the point of juncture with the vertex 73 of the cone 72.

Mounted on the shaft 13 are a pair of conical shields 81 and 82, the shield 81 overlying the upper end of the shield 79 and being spaced therefrom the shortest possible distance required to mount the shields 79 and 81 on the separate shafts. The shield 82 is mounted a sufficient distance above the shield 81 so that its vertex is received in the lower end of a pipe 83 depending from the cover 3 and within which are mounted the bearings 15 which support the upper end of the shaft 13. The outer edges of the shields 81 and 82 are connected by a circular vertical wall section 84 which, together with conical shields 81 and 82, forms an extension of the shield 79 whereby the shield structure extends from the point of juncture with the vertex of the cone 72 to the vertex of the cone 82; the reason for the two part construction being that the upper portion of the shield comprising the cones 81 and 82 and the vertical wall 84 is secured to and rotates with the shaft 13, whereas the lower part of the construction comprising the shield 79 is secured to and rotates with the shaft 12. The diameter of the upper portion of the shield structure comprising the circular wall 84 is somewhat greater than the diameter of the double ended cone 79 so that grease and other particles of condensate flowing downwardly over the upper surface of cone 82 and the outer surface of the cylindrical wall 84 will drip clear of the shield 79 onto the conical shield 72 and flow from thence into the trough 75.

The pipe 83 comprises a part of a ventilating system for removing smoke and vapors arising from the cooking surface 33. Mounted on the shaft 13 within the pipe 83 is a double ended cone 85, the lower end of the cone being secured to the shaft 13 at the point of juncture with the vertex of the cone 82. The upper vertex of the double ended cone 85 is secured to the shaft 13 adjacent the rim of a circular baffle 86 supported by the pipe 83 and extending thereinto in position to define, with the upper vertex of the double ended cone 85, an annular opening 87 of restricted area.

It will be noted that the conical shield 82 is so disposed relative to the lower end 88 of the pipe 83 as to form an annular opening into the pipe, the opening being so disposed that entering gases and vapors are impinged against the lower surface of the double ended cone 85 and from thence are caused to follow a tortuous path extending first outwardly around the flaring walls of the double ended cone 85 and then inwardly between the upper surface of the double ended cone 85 and the lower surface of the baffle 86. It will be noted that from the point of approach to the lower end of pipe 83 the path of exit for vapors being withdrawn from the cooking chamber is progressively restricted in area until the vapors pass through the annular opening 87. This progressively restricted tortuous path of exit for vapors being withdrawn from the cooking chamber produces extraction of condensed particles of grease and other similar substances from such vapors, the condensed particles being collected on the surfaces of the double ended cone 85 and the under surface of the baffle 86. It will be noted that the baffles and conical shields are so constructed as to provide for the flow of condensate from each upper surface to a downwardly sloping surface therebeneath intended to catch the drip from such upper surface until such time as the condensate is delivered from the lower edge of the wall 74 into the trough 75. The ventilating system further comprises a fan 89 or other suction means mounted in the pipe 83 for withdrawing air and gases from the cooking chamber. Air enters the cooking chamber through the peripheral opening in the wall of the cabinet, the entering air flowing across the cooking surface 33 and carrying the smoke and vaporized grease and similar substances upwardly through the interior of the cabinet to the point of withdrawal therefrom through the pipe 83 as hereinabove described.

The grill comprises a plurality of wire trays 91, each tray being of generally rectangular shape and being of sufficient size to accommodate the two halves of a bun laid thereupon. Each tray comprises a rod 92 having its inner end journalled in the circular vertical wall 84 and comprising at its outer end a slide 93 received within an inwardly facing groove 90 provided in a peripheral trackway 94 supported by the uprights 5. The rod 92 constitutes the forward or leading edge of each tray, the remainder of the tray comprising a rearwardly extending framework 95 having means extending between the rods 92 and the frame 95 for supporting the buns. The rearwardly extending frame of the tray is supported by a roller 96 journaled on a shaft projecting radially from the framework of the tray. The roller 96 is supported upon a track 97 which is a portion of the structure affixed to the support members 5 for supporting the outer ends of the several trays 91.

At a point above the place where the cooked food is removed from the cooking surface 33 the track 97 is elevated for a short distance, the elevated portion 98 being provided with an approach 99 and a decline 101. As the rollers 96 roll up the approach 99 to the plane of the elevated portion 98 of the track, each succeeding tray passing thereover is tilted in the forward direction, the rod 92 comprising the leading edge of the tray being held in a horizontal plane by the slide 93 engaging in the groove 90. When the trays are tilted by reason of the elevated portion 98 of the track 97, the buns are spilled therefrom onto the slide 102 which delivers them into a basket or other suitable receptacle 103 supported on the outer wall of the cabinet.

The elevated portion 98 of the track 97 is of such length that a first tray from which the two halves of a bun have been spilled onto the slide 102 is held in the tilted position until after the following tray has also been tilted and has spilled its load onto the slide 102. After the second tray has advanced onto the elevated portion of the track for a distance sufficient to insure that the buns have been spilled therefrom, the roller 96 of the first tray follows down the decline 101 to the plane of the track 97 permitting the tray to assume a horizontal position in readiness to receive a new charge of buns.

Mounted above the grill is an electrical heating element 104, this heating element being generally circular and having a heat reflecting area substantially equal to the area of the grill therebeneath. The heating element 104 is mounted in an inverted channel member 105 supported at its center by the pipe 83 and at its periphery by the upper wall section 2 of the cabinet. An electrical conduit, represented by wires 106, supplies electrical current to the heating element 104 from a switch having a button 107 mounted on the outer wall 1 of the cabinet.

In Figure 9 is shown a cooking apparatus equipped with gas burners in place of the electrical heating units hereinbefore described. The construction shown embodies the gas burner 111 mounted within the channel member 34 comprising the rotatable griddle. The depending side walls of the channel member are provided with vent ports 112 adjacent the sides of the gas burner 111. The channel 34 is supported on the spider 31 extending radially upward from the hub member 31a affixed to the shaft 12 as shown in Figure 3. The gas burner 111 is fixedly mounted in the cabinet, being supported upon bracket 113 affixed to the uprights or bolts 5. Gas is supplied to the burner 111 through pipe 114 positioned between uprights 5 adjacent the front wall of the cabinet. The pipe 114 is equipped with a valve for controlling the flow of gas to the burner 111, the thumb and finger piece 110 for the valve extending through the front wall of the cabinet.

A gas burner 115 is mounted in the channel member 51 comprising the broiler unit, the burner 115 being inverted for directing the flame downwardly in the direction of the cooking surface 33 of the griddle. The burner 115 is fixedly mounted in the channel member 51, and is supplied with gas through pipe 116 positioned closely adjacent the front wall of the cabinet between uprights 5. The pipe 116 is equipped with a valve having a thumb and finger piece 117 for controlling the flow of gas to the burner.

A gas burner 118 is mounted in the channel member 105 and is so positioned as to direct its flame downwardly in the direction of buns or other food products placed on the trays 91. The burner 118 is fixedly mounted in the channel member 105 and is supplied with gas through pipe 119 having a valve for controlling the flow of gas to the burner, the thumb and finger piece 120 of the valve extending through the front wall of the cabinet.

In all other respects the construction shown in Figure 9 is exactly as shown in Figure 3 and as hereinbefore described, and no further description thereof appears to be necessary.

The invention is particularly useful for the cooking of meat such as hamburger, steaks, fish, and the like, which are to be prepared according to the tastes of individuals to whom the food is served. More particularly, however, the invention finds practical application in a device intended for preparing toasted sandwiches consisting essentially of toasted bread and cooked inserts such as hamburger or other meat. In the preparation of a sandwhich such as a "hamburger," for example, the buns are halved and the two halves placed in one of the trays 91, an opening having a hinged closure member 108 in the upper wall portion 2 of the cabinet providing access to the grill. The meat insert is placed on the cooking surface 33 of the griddle through that one of the openings in the wall of the cabinet as determined by the degree of cooking which the product is intended to receive. The speed of rotation of the griddle 32 is so adjusted through operation of the switch 29 as to accomplish the maximum degree of cooking during the maximum distance of rotation of the griddle from the point at which the meat is placed on the griddle to the point of removal therefrom. The desired degree of cooking is accomplished automatically by using predetermined cooking temperatures and rotating speeds, and varying the period of cooking as determined by the distance between the points of application and removal of the food from the griddle. Automatic removal of the food products from the griddle lessens the chance of error due, for example, to distraction or neglect of the operator. Likewise, the toasting of the buns is accomplished automatically, the degree of heat supplied by the heating unit 104 and the speed of rotation of the grill being determined by operation of the switches 107 and 29 to accomplish the desired toasting effect during the period of rotation of the grill between the point at which the buns are placed on the trays and the point at which they are discharged therefrom. The construction provides a ventilating system by which vapors arising from the cooking surface are delivered away from the cooking apparatus and products of condensation such as grease, meat juices and the like, are recovered within the apparatus.

Having now described my invention and in what manner the same may be used, what I claim as new and desire to protect by Letters Patent is:

1. A cooking apparatus comprising a housing having walls defining a cooking chamber, means defining a peripherally extending opening in the wall of said chamber, a rotatable griddle rotatably mounted in said chamber having an annular cooking surface supported in a horizontal plane below and adjacent said opening, a ventilation system for said apparatus comprising duct means defining a ventilation passageway, said duct means extending into said chamber, means in said passageway for creating an entering current of air through said peripheral opening and for withdrawing air and vapors from said cooking chamber, a series of baffles arranged in said chamber centrally of said annular cooking surface for directing the flow of air and vapors through said chamber, at least one of said baffles extending into said duct means and defining therewith a tortuous exit passageway for said air and vapors of progressively diminishing area.

2. A cooking apparatus comprising a housing having walls defining a cooking chamber, means defining a peripherally extending opening in the wall of said chamber, a rotatable griddle rotatably mounted in said chamber having an annular cooking surface supported in a horizontal plane below and adjacent said opening, a ventilation system for said apparatus comprising duct means defining a ventilation passageway, said duct means extending into said chamber, means in said passageway for creating an entering current of air through said opening and for withdrawing air and vapors from said cooking chamber, a plurality of shields mounted in said chamber centrally of said annular cooking surface for directing the flow of air and vapors through said chamber, said shields and said duct means defining a tortuous exit passageway of progressively diminishing area for said air and vapors for causing products of condensation carried by said air and vapors to impinge upon the walls of said passageway, said shields providing a series of downwardly sloping surfaces, and a trough arranged beneath said lowermost shield for collecting products of condensation flowing therefrom.

3. A cooking apparatus comprising a housing having walls defining a cooking chamber, means defining a peripherally extending opening in the wall of said chamber, a rotatable griddle rotatably mounted in said chamber having an annular cooking surface supported in a horizontal plane below and adjacent said opening, a ventilation system for said apparatus comprising duct means defining a ventilation passageway, said duct means extending into said chamber, means in said passageway for creating an entering current of air through said opening and for withdrawing air and vapors from said cooking chamber, a plurality of conically shaped shields mounted centrally in said chamber for directing the flow of air and vapors through said chamber, said shields and said duct means defining a tortuous exit passageway of progressively diminishing area for said air and vapors for causing products of condensation carried by said air and vapors to impinge upon the walls of said passageway, said conically shaped shields providing a series of downwardly sloping surfaces, the lowermost of said shields extending through the center of said griddle and being provided with a depending apron, and a trough arranged beneath said depending apron for collecting products of condensation and griddle drippings flowing therefrom.

4. A cooking apparatus comprising a vertical cylindrical housing, narrow peripheral air inlet means around said housing, a rotatable griddle in said housing having an annular cooking surface below and adjacent said air inlet means, a ventilation duct extending centrally into said housing, a vertical series of conical shields and baffles disposed centrally in said housing with at least the uppermost of said baffles extending into said duct and the lowermost of said shields extending through the center of said griddle, and a trough beneath said lowermost shield.

5. A cooking apparatus comprising a housing, narrow peripheral air inlet means around said housing, a rotatable griddle in said housing having an annular cooking surface below and adjacent said air inlet means; and fume and grease disposal means in the center of said housing comprising a central ventilation duct in the top of said housing, a grease and drippings receptacle under said griddle, and a vertical series of circular shields and baffles extending from said receptacle through said griddle and into said duct to catch drippings from said griddle and to extract particles of condensation from the fumes entering said duct.

6. A cooking apparatus as defined in claim 4, said lowermost conical shield having an apex above the level of said cooking surface and a base below said level, and means supporting said griddle and shield for rotation as a unit.

7. A cooking apparatus as defined in claim 6 having interiorly shielded access openings in said housing intersecting and extending upwardly from said peripheral air inlet means adjacent said griddle for the introduction of articles of food to be cooked.

8. A cooking apparatus as defined in claim 7 having a rotary griddle cleaning device extending over the inner edge of said annular cooking surface to discharge grease and food particles from the griddle onto said shield for disposal in said trough.

9. A cooking apparatus as defined in claim 4 having interiorly shielded access openings in said housing adjacent said griddle for the introduction of food to be cooked, and a plurality of arcuate broiler units above said griddle and peripheral air inlet means and extending around said housing in intervals between said shielded openings to broil food on said griddle.

10. A cooking apparatus comprising an annular griddle mounted for rotation, a housing having a peripheral side wall around the griddle to confine cooking smoke and vapors from the griddle, a ventilation duct having an inlet end disposed centrally in said housing to remove said cooking smoke and vapors by suction, a vertical series of conical shields and baffles disposed centrally in said housing with at least the uppermost of said baffles extending into said duct and the lowermost of said shields extending through the center of said griddle, a trough beneath said lowermost shield to catch the liquid and solid materials collected by all of said baffles and shields, and interiorly shielded access openings in said peripheral side wall adjacent said griddle and extending above the level of the griddle for the introduction of food to be cooked, whereby outside air is drawn in through all openings in said housing and said smoke and vapors are drawn away from said openings and toward the center of the housing by the suction of said ventilation duct.

RICHARD E. STAPLES.

REFERENCES CITED

The following references are of record in the file of this patent:

UNITED STATES PATENTS

| Number | Name | Date |
|---|---|---|
| 1,312,833 | Colias | Aug. 12, 1919 |
| 1,584,619 | Lloyd | May 11, 1926 |
| 1,631,655 | Sunderland | June 7, 1927 |
| 1,710,586 | McCrory | Apr. 23, 1929 |
| 1,731,743 | Harrison | Oct. 15, 1929 |
| 1,732,315 | Ray | Oct. 22, 1929 |
| 1,795,710 | Clark | Mar. 10, 1931 |
| 1,869,539 | Brand | Aug. 2, 1932 |
| 2,015,358 | Brokvist | Sept. 24, 1935 |
| 2,168,773 | Parr | Aug. 8, 1939 |
| 2,372,362 | Dawson | Mar. 27, 1945 |
| 2,392,038 | Gaylord | Jan. 1, 1946 |

FOREIGN PATENTS

| Number | Country | Date |
|---|---|---|
| 297,393 | Italy | June 11, 1932 |